Figure 1:
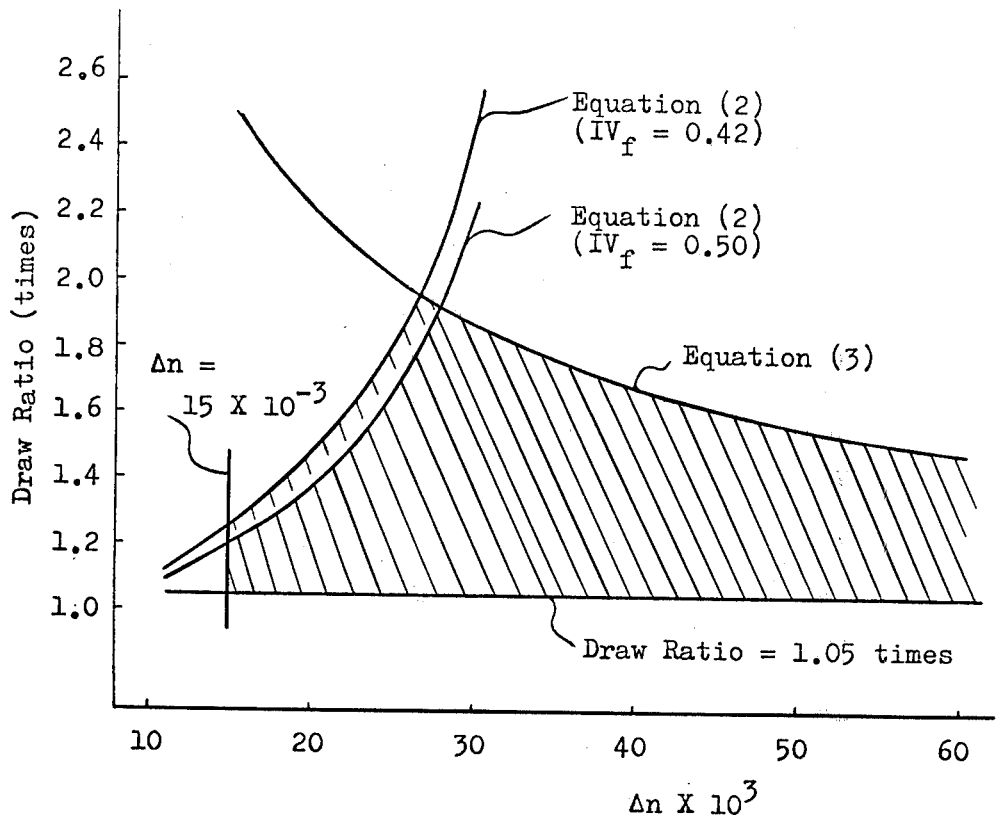

United States Patent [19]

Yasuda et al.

[11] 4,076,783
[45] Feb. 28, 1978

[54] METHOD FOR PRODUCING POLYESTER FIBERS

[75] Inventors: Hiroshi Yasuda; Susumu Omori, both of Otsu, Japan

[73] Assignee: Toyobo Co., Ltd., Osaka, Japan

[21] Appl. No.: 532,466

[22] Filed: Dec. 13, 1974

[30] Foreign Application Priority Data

Dec. 13, 1973 Japan .................................. 48-140153

[51] Int. Cl.$^2$ .............................................. D01F 1/04
[52] U.S. Cl. .................................... 264/78; 8/168 C; 264/210 F; 264/290 T
[58] Field of Search ............ 264/176 F, 290 T, 210 F, 264/78; 8/179, 168 C

[56] References Cited

U.S. PATENT DOCUMENTS

| | | | |
|---|---|---|---|
| 2,952,879 | 9/1960 | Kitson et al. | 264/290 T |
| 3,448,573 | 6/1969 | Glen et al. | 264/290 T |
| 3,527,862 | 9/1970 | Shimosaka et al. | 264/290 T |
| 3,539,680 | 11/1970 | Furushima et al. | 264/290 T |
| 3,771,307 | 11/1973 | Petrille | 57/157 TS |
| 3,772,872 | 11/1973 | Piazza et al. | 57/157 TS |
| 3,816,994 | 6/1974 | Small | 57/157 TS |
| 3,832,436 | 8/1974 | Harvis et al. | 264/290 T |
| 3,886,722 | 6/1975 | Hori et al. | 57/157 TS |
| 3,936,999 | 2/1976 | Ikeda et al. | 57/157 TS |

FOREIGN PATENT DOCUMENTS

| | | | |
|---|---|---|---|
| 46-33,732 | 10/1971 | Japan | 264/230 |
| 1,050,393 | 12/1966 | United Kingdom | 264/290 T |

*Primary Examiner*—Jay H. Woo
*Attorney, Agent, or Firm*—Birch, Stewart, Kolasch and Birch

[57] ABSTRACT

A method for producing polyester fibers having excellent dyeability with basic dyes or disperse dyes, which comprises melt-spinning a polyester comprising predominantly (at least 80% by mol) repeating units of ethylene terephthalate and containing 0.5% by mol or more, preferably 1.5 to 5% by mol of an ester unit derived from a dicarboxylic acid or diol containing at least one metal sulfonate group under the condition of being highly oriented so as to give filaments having a birefringence ($\Delta n$) of 0.015 to 0.100 and drawing the resulting filaments at a fixed temperature and in a fixed draw ratio, and the polyester fibers which can be dyed with basic dyes or disperse dyes at a temperature of less than 100° C at a sufficiently high dye adsorption rate to give dyed fibers.

8 Claims, 1 Drawing Figure

METHOD FOR PRODUCING POLYESTER FIBERS

The present invention relates to a method for producing polyester fibers having excellent dyeability with basic dyes and disperse dyes. More particularly, it relates to a method for producing polyester fibers by melt-spinning a polyester comprising predominantly repeating units of ethylene terephthalate and containing 0.5% by mol or more of an ester unit derived from a dicarboxylic acid or diol containing at least one metal sulfonate group under the condition of being highly oriented so as to give filaments having a birefringence ($\Delta n$) of 0.015 to 0.100 and drawing the resulting filaments at a fixed temperature and in a fixed draw ratio.

It is well known that sulfonate group-containing polyester fibers have a dyeability with basic dyes and can be produced by copolymerizing a polyester comprising predominantly repeating units of ethylene terephthalate with a dicarboxylic acid or diol containing at least one metal sulfonate group. However, the content of the sulfonate group in the polyester fibers is hardly increased because the increase of the sulfonate group content results in difficulty of the polymerization reaction and the subsequent spinning. Accordingly, there is a limitation in the increase of the dyeability with basic dyes of the polyester fibers by the addition of a sulfonate group thereto, and unless the sulfonate group-containing polyester fibers are dyed at a high temperature of around 120° C and under a high pressure, the dye adsorption can not be satisfactorily enhanced. That is, when they are dyed by boiling, the rate of dye adsorption is only about 30%, and for increasing the rate of the dye adsorption to 100% it must be dyed at a high temperature of around 120° C and under a high pressure.

Besides, the sulfonate group-containing polyester fibers are usually easily hydrolyzed, and therefore, when they are subjected to a wet heating at a high temperature, the filaments are disadvantageously deteriorated. Although the hydrolysis depends on the pH value of the treating solution, when the temperature is over 100° C, they are remarkably deteriorated. For instance, in case of polyester fibers having an intrinsic viscosity ($IV_f$) of 0.37 (at 30° C in a mixed solvent of phenol:tetrachloroethane = 3:2), which comprises predominantly repeating units of ethylene terephthalate and contains 2% by mol (on the basis of the dimethyl terephthalate) of sodium 3,5-di(carbomethoxy)benzenesulfonate, the intrinsic viscosity after the treatment in boiling water of 100° C or in water at 120° C under pressure for 30 minutes is as shown in the following Table 1.

Table 1

| Temperature | pH Value | | | |
| --- | --- | --- | --- | --- |
| (° C) | 3.0 | 4.0 | 6.5 | 8.5 |
| 100 | 0.30 | 0.35 | 0.36 | 0.35 |
| 120 | 0.13 | 0.19 | 0.30 | 0.26 |

Thus, when the sulfonate group-containing polyester fibers are dyed at a high temperature and under a high pressure to effect deep coloring, it naturally results in the deterioration of the filaments owing to the hydrolysis.

Moreover, since the polyester fibers can not be dyed at a temperature of less than 100° C and at atmospheric pressure but must be dyed at a high temperature and under a high pressure, the dyestuffs used are limited to those having a high heat stability and further an expensive high-pressure dyeing apparatus is required. Moreover, when the polyester fibers are used together with other fibers which are not suitable for a high-pressure dyeing such as cotton and wool, the desired deep coloring can not be achieved.

Under the circumstances, the present inventors have studied to obtain polyester fibers having an improved dyeability, and have found that the desired polyester fibers can be produced by melt-spinning a sulfonate group-containing polyester under the condition of being highly oriented so as to give filaments having a birefringence ($\Delta n$) of 0.015 to 0.100 and drawing the resulting filaments at a fixed temperature and in a fixed draw ratio.

An object of the present invention is to provide an improved method for producing polyester fibers having excellent dyeability with basic dyes and disperse dyes.

Another object of the invention is to provide polyester fibers which can be dyed in a high dye adsorption at a temperature of less than 100° C, at which no deterioration of the filaments occurs.

These and other objects of the invention will be apparent from the description hereinafter.

According to the present invention, the desired polyester fibers can be produced by melt-spinning a polyester comprising predominantly repeating units of ethylene terephthalate and containing 0.5% by mol or more of an ester unit derived from a dicarboxylic acid or diol containing at least one metal sulfonate group under the condition of being highly oriented so as to give filaments having a birefringence ($\Delta n$) of 0.015 to 0.100 and drawing the resulting filaments at a temperature of less than the melting point of the polymer and satisfying the following equation (1) and at a draw ratio of from 1.05 times up to the maximum ratio of the following equations (2) and (3):

$$100 \leq T \leq 4 \times (\Delta n \times 10^3) + 70 \tag{1}$$

$$DR_{max_1} = \frac{1}{1.61 + 1.01(IV_f) - 0.0518(\Delta n \times 10^3)} + 0.5 \tag{2}$$

$$DR_{max_2} = \frac{30}{\Delta n \times 10^3 + 5} + 1.05 \tag{3}$$

wherein T is the drawing temperature (° C), $\Delta n$ is the birefringence of the filaments obtained after the melt-spinning, $DR_{max_1}$ and $DR_{max_2}$ are each the maximum draw ratio (times), and $IV_f$ is the intrinsic viscosity of the filaments obtained after the meltspinning, which is measured at 30° C in a mixed solvent of phenol:tetrachloroethane = 3:2.

The sulfonate group-containing polyester used in the present invention as the starting material contains at least 80% by mol of repeating units of ethylene terephthalate and is produced by copolymerizing ethylene glycol or oxide and terephthalic acid or a functional derivative thereof together with a dicarboxylic acid or diol containing a metal sulfonate group of the formula:

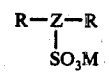

wherein Z is a trivalent aromatic or aliphatic hydrocarbon group

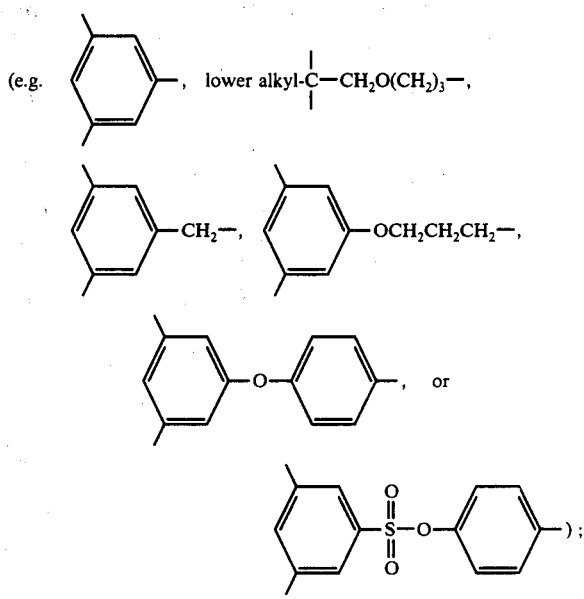

(e.g.

R is a group selected from the group consisting of the following formulae:

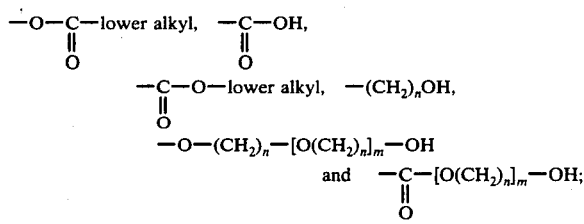

$n$ and $m$ are each an integer of 1 or more, preferably 1 to 4; M is a metal (e.g. sodium, potassium or lithium); and the lower alkyl has 1 to 4 carbon atoms, in the presence or absence of one or more other copolymerizable monomers, such as a bifunctional acid (e.g. isophthalic acid, adipic acid or p-hydroxybenzoic acid) or a derivative thereof and/or a divalent alcohol (e.g. diethyleneglycol, propyleneglycol, 1,4-butanediol or 1,4-hydroxymethylcyclohexane). The starting sulfonate group-containing polyester may also be a blend of the sulfonate group-containing polyester obtained above and a polyester containing at least 80% by mol of repeating units of ethylene terephthalate. The starting sulfonate group-containing polyester should contain the sulfonate group-containing ester unit in an amount of 0.5% by mol or more, preferably 1.5 to 5% by mol. The starting polyester may preferably have an intrinsic viscosity ($IV_p$) of 0.35 to 0.55, more preferably 0.37 to 0.45.

Suitable examples of the dicarboxylic acid and diol containing a metal sulfonate group are sodium 3,5-di(-carbomethoxy)benzenesulfonate, potassium 3,5-di(carbomethoxy)benzenesulfonate, sodium 1,8-di(carbomethoxy)naphthalene-3-sulfonate, potassium 2,5-di(carbomethoxy)benzenesulfonate, potassium 2,5-di(hydroxyethoxy)benzenesulfonate, or the like.

According to the present invention, the sulfonate group-containing polyester is molten and spun under the condition of being highly oriented so that the birefringence ($\Delta n$) of the resulting filaments is in the range of 0.015 to 0.100, preferably 0.020 to 0.050. The melt spinning at a high orientation may be carried out, for instance, by raising the rate for winding up the spun filaments higher than about 2,000 m/minute, by increasing the spinning draft by means of enlarging the orifice diameter of the spinneret, by lowering the spinning temperature as much as possible, by more strongly cooling the spun filaments, or by any combination of these methods (cf. Dr. Hermann Ludewig; Polyesterfasern, pages 159 - 163, 1965, issued by Academie-verlag-Berlin).

The filaments thus produced have a birefringence ($\Delta n$) of 0.015 or more, and the filaments having a higher birefringence can give the desirable product having more excellent dyeability. Although it is not clear why the dyeability is improved by melt-spinning under a high orientation condition, it is assumed that under the high orientation condition the non-crystalline area of the filaments is almost not oriented and further the sulfonate group-containing segments tend to concentrate in the non-crystalline area, and as the result, the filaments have a fine structure which adsorbs easily the dyes even after the drawing, contrary to the conventional filaments. Thus, it is preferable that the filaments after the spinning have as high a birefringence ($\Delta n$) as possible, but it is disadvantageous to control the spinning condition such that the birefringence is over 0.100 from the viewpoints of the inferior spinnability and the high cost for the apparatus.

The spun filaments thus obtained are then drawn as they are or after they are wound up on bobbins or collected into a container. When they are not drawn, they have too high of an elongation at break and can not be practically used.

In this drawing step, the high dyeability of the filaments tends to decrease. For preventing such defect, the present inventors have extensively studied the conditions for the drawing and have found that when the drawing is carried out at a temperature of less than the melting point of the polymer and satisfying the above equation (1) and at a draw ratio of from 1.05 times up to the maximum draw ratio of the above equations (2) and (3), there can be obtained the desired, practically useful polyester fibers having an extremely excellent dyeability with basic dyes or disperse dyes even after the drawing step.

That is, for preventing the destruction of the structure effective for such high dyeability, the drawing temperature should be at the lowest 100° C, preferably 120° C or higher and lower than the melting point of the polymer and further not higher than $4 \times (\Delta n \times 10^3) + 70°$ C, preferably not higher than $4 \times (\Delta n \times 10^3) + 60°$ C. When the conventional polyester fibers are drawn at 100° C or higher, there results a super draw and the desired orientation can not be obtained. On the contrary, in case of the spun filaments having a high birefringence as in the present invention, they are more advantageously drawn at a high drawing temperature of 100° C or higher, and when they are drawn at a low drawing temperature of lower then 100° C, an inferior dyeability results. Besides, when the drawing temperature is out of the above range, there results many occurrences of the fusing and breakage of the filaments. The drawing is preferably carried out by using steam of 100° C or higher or a heat plate.

The maximum draw ratio is particularly determined by the above equation (2), and when the ratio is over this range, the dyeability of the polyester fibers is decreased. That is, when the intrinsic viscosity ($IV_f$) of the filaments after the melt-spinning is smaller and when the birefringence ($\Delta n$) after the melt-spinning is larger, the maximum draw ratio can be made higher. Thus, from the viewpoint of the dyeability, when the birefringence ($\Delta n$) is larger, the higher maximum draw ratio is applicable, but on the other hand, the maximum draw ratio is also restricted from the viewpoints of the elongation properties of the drawn filaments and the operability. The maximum draw ratio is determined by the above equation (3). When the filaments are drawn over the maximum draw ratio of the equation (3), the elongation properties of the drawn filaments are remarkably decreased and further breaking of the filaments occurs very often and the operation can not practically be continued. Consequently, the maximum draw ratio is determined by both of the above equations (2) and (3). In case of the filaments having an intrinsic viscosity ($IV_f$) of 0.42 and 0.50, the range of the draw ratio may be illustrated by FIG. 1, wherein the shaded area is the desired range of the draw ratio.

The drawn fibers thus obtained can be dyed at a temperature of less than 100° C at a sufficiently high dye adsorption rate to give dyed fibers. In case of spun yarns, after drawing, they are cut into staple fibers and then sufficiently dyed in a form of a tow, staple, filament, knitted web or woven fabric at a temperature of less than 100° C during any step leading to the final product. In the dyeing step, no carrier is needed. As the dyes, there may be used basic dyes and also other disperse dyes.

According to the present method, there can be obtained polyester fibers having a high dyeability with basic dyes or disperse dyes without any deterioration of the filaments owing to the hydrolysis thereof. The polyester fibers of the present invention need not to be dyed at a high temperature and under a high pressure, and therefore, various kinds of dyes can be used and, further, various kinds of other fibers can be used together therewith. Moreover, the present polyester fibers do not require the use of a specific high-pressure dyeing apparatus and further can be dyed continuously in the atmosphere, and therefore, the present invention is advantageous from the viewpoint of the cost for the apparatus.

The present invention is illustrated by the following Examples but is not limited thereto.

In the Examples, the intrinsic viscosity of the polymer and the filaments is measured at 30° C in a mixed solvent of phenol:tetrachloroethane = 3:2. The dye exhaustion (i.e. rate of dye adsorption) is calculated by measuring the color difference between the original dye solution before the dyeing and the remaining solution after the dyeing by colorimetry, wherein the original dye solution is prepared so that the content of the dye is 5% by weight on the basis of the weight of the fibers to be dyed, and when the remaining solution becomes completely colorless, the dye exhaustion is 100%, when the color concentration of the remaining solution is half of that of the original dye solution, the dye exhaustion is 50% and when the color concentration of the remaining solution is the same as that of the original dye solution, the dye exhaustion is 0%.

The birefringence ($\Delta n$) is measured by a conventional method (cf. J. F. Rund & R. B. Andrews, Journal of Applied Physics, Vol. 27, page 996, 1956).

EXAMPLE 1

A mixture of dimethyl terephthalate and ethylene glycol is subjected to polycondensation by an ester exchange reaction in the presence of sodium 3,5-di(carbomethoxy)benzenesulfonate (2% by mol on the basis of dimethyl terephthalate) to give a polyester having an intrinsic viscosity ($IV_p$) of 0.38 and a melting point of 258° C.

The polyester thus obtained is molten and extruded through a spinneret having 300 orifices of 0.3 mm in diameter at a spinning temperature of 270° C, and the emerged filaments are rapidly cooled by blowing cooled air at a speed of 0.9 m/second just under the spinneret and are then wound up on bobbins at a rate of 2,500 m/minute. The spun filaments have a birefringence ($\Delta n$) of 0.021 and an intrinsic viscosity ($IV_f$) of 0.37.

The spun filaments are bundled in the form of tows and are drawn 1.4 times at 140° C to give drawn tows comprising filaments of a denier: 2.59 d, a tenacity: 2.56 g/d and an elongation: 16.1%. The tows thus obtained are dyed by boiling with a basic dye C. I. Basic Orange 22 at 100° C for 90 minutes to give filaments dyed with a deep orange color. The dye exhaustion is 94%.

In the above procedure, when the tows are drawn at 80° C instead of 140° C, the characteristics of the drawn tows are a tenacity: 2.07 g/d and an elongation: 12.5%, and the orange color after the boil dyeing is fairly lowered (the dye exhaustion: 62%). When the tows are drawn at 160° C, the filaments are cut very often because of the fusing thereof and the desirable drawing can not be carried out.

Besides, when the tows are drawn at 140° C and in a rate of 1.9 times instead of 1.4 times, the drawn tows are not dyed to a deep color by the boil dyeing (the dye exhaustion: 42%).

Moreover, when the drawing step of the tows is omitted in the above procedure, the fibers are fairly well dyed by the boil dyeing with a basic dye (the dye exhaustion: 72%), but the characteristics of the filaments are impractically inferior (a tenacity: 1.15 g/d and an elongation: 182.0%).

When the same polyester used in the above example is melt-spun by a conventional method and the resulting filaments are wound up on bobbins at a rate of 1,300 m/minute, the spun filaments have a birefringence ($\Delta n$) of 0.009 and an intrinsic viscosity ($IV_f$) of 0.37. The filaments are drawn 3.0 times at 80° C and then subjected to a boil dyeing in the same manner as described in the above example. As the result, merely a faintly orange colored filaments are obtained. The dye exhaustion is 21%.

EXAMPLE 2

The same polyester as in Example 1 except the intrinsic viscosity ($IV_p$) being 0.50 and the melting point being 257° C is used. The polyester is extruded through the same spinneret as in Example 1 at a spinning temperature of 290° C, and the emerged filaments are rapidly cooled by blowing cooled air at a speed of 0.4 m/second just under the spinneret and they are wound up on bobbins at a rate of 2,000 m/minute. The spun filaments have a birefringence ($\Delta n$) of 0.021 and an intrinsic viscosity ($IV_f$) of 0.49.

The spun filaments are bundled in the form of tows and are drawn 1.4 times at 140° C to give drawn tows comprising filaments of a denier: 2.41 d, a tenacity: 2.93 g/d and an elongation: 20.1%. The drawn tows thus obtained are dyed by boiling with a basic dye C. I. Basic Blue 21 at 100° C for 90 minutes to give filaments dyed with a deep blue color (the dye exhaustion: 85%).

In the above procedure, when the tows are drawn at a rate of 1.6 times instead of 1.4 times, the blue color of the filaments after the boil dyeing is somewhat lowered and the dye exhaustion is also lowered to 64%.

EXAMPLE 3

Example 2 is repeated except that the spinning speed is 3,200 m/minute to give spin filaments having a birefringence ($\Delta n$) of 0.032 and an intrinsic viscosity ($IV_f$) of 0.49. The spun filaments are bundled in the form of tows and are drawn 1.4 times at 140° C. The tows thus obtained are subjected to a boil dyeing in the same manner as in Example 2 to give filaments dyed in a deep blue color. The dye exhaustion is 99%.

When the spun filaments are drawn 2.1 times at 140° C and the resulting drawn filaments are subjected to the boil dyeing at 100° C, the dye exhaustion is fairly good (83%), but marked nappings occur during the drawing and the product is impractical.

EXAMPLE 4

The same polyester as in Example 1 is treated in the similar manner as in Example 1 under the various conditions as mentioned in the following Table 2. The characteristics of the filaments thus obtained are also shown in Table 2.

to the maximum draw ratio of the following equations (2) and (3):

$$DR_{max_1} = \frac{1}{1.61 + 1.01(IV_f) - 0.0518(\Delta n \times 10^3)} + 0.5 \quad (2)$$

$$DR_{max_2} = \frac{30}{\Delta n \times 10^3 + 5} + 1.05 \quad (3)$$

wherein $\Delta n$ is as defined above, $DR_{max_1}$ and $DR_{max_2}$ are each the maximum draw ratio, and $IV_f$ is the intrinsic viscosity of the filaments obtained after the melt-spinning which is measured at 30° C in a mixed solvent of phenol:tetrachloroethane = 3:2.

2. The method for producing polyester fibers according to claim 1, wherein the starting polyester contains at least 80% by mol of repeating units of ethylene terephthalate and is produced by copolymerizing ethylene glycol or oxide and terephthalic acid or a functional derivative thereof together with a dicarboxylic acid or diol containing a metal sulfonate group of the formula:

Table 2

|  | The present invention | | Controls | | | | | |
| --- | --- | --- | --- | --- | --- | --- | --- | --- |
|  | A | B | C | D | E | F | G | H |
| Intrinsic viscosity of polyester ($IV_p$) | 0.38 | 0.38 | 0.38 | 0.38 | 0.38 | 0.38 | 0.32* | 0.60* |
| Spinning temperature (° C) | 270 | 270 | 270 | 270 | 270 | 270 | 270 | 270 |
| Winding speed (m/minute) | 2500 | 3200 | 2500 | 2500 | 2500 | 1600 | 2500 | 2500 |
| Intrinsic viscosity of fiber ($IV_f$) | 0.37 | 0.37 | 0.37 | 0.37 | 0.37 | 0.37 | — | — |
| Birefringence ($\Delta n$) | 0.021 | 0.027 | 0.021 | 0.021 | 0.021 | 0.013* | — | — |
| Drawing temperature (° C) | 150 | 150 | 80* | 180* | 140 | 105 | — | — |
| Draw ratio (times) | 1.5 | 1.3 | 1.4 | 1.4 | 1.8* | 2.1 | — | — |
| Denier of filaments (d) | 2.31 | 2.71 | 2.58 | 2.58 | 2.12 | 2.45 | The spun filaments can not be woun up because the filaments are cut. | The viscosity is too high and it can not be spun. |
| Dry tenacity (g/d) | 2.82 | 2.53 | 2.51 | 2.58 | 3.01 | 2.69 | | |
| Dry elongation (%) | 12.8 | 15.2 | 14.1 | 16.3 | 8.2 | 18.1 | | |
| Dye exhaustion (%) | 81 | 95 | 51 | 92 | 52 | 45 | | |
| Spinnability | Good | Good | Good | Filaments are fused and cut. | Good | Good | | |

[Note]:
*Out of the conditions of the present invention

As is made clear from the above results, when the conditions for melt-spinning and drawing are outside of those in the present invention, the fibers are inferior in the dyeability and/or spinnability.

What is claimed is:

1. A method for producing polyester fibers having excellent dyeability, and capable of being dyed with basic or disperse dyes at a temperature of less than 100° C. with no deterioration of said fibers, which comprises melt-spinning a polyester comprising predominantly repeating units of ethylene terephthalate and containing 0.5% by mol or more of an ester unit derived from a dicarboxylic acid or diol containing at least one metal sulfonate group under the condition of being highly oriented so as to give filaments having a birefringence ($\Delta n$) of 0.015 to 0.100 and drawing the resulting filaments at a temperature of less than the melting point of the polymer and satisfying the following equation (1):

$$100 \leq T \leq 4 \times (\Delta n \times 10^3) + 70 \quad (1)$$

wherein T is the drawing temperature (° C) and $\Delta n$ is the birefringence of the filaments obtained after the melt-spinning, and at a draw ratio of from 1.05 times up wherein Z is a trivalent aromatic or aliphatic hydrocarbon group; R is a member selected from the group consisting of the following formulae:

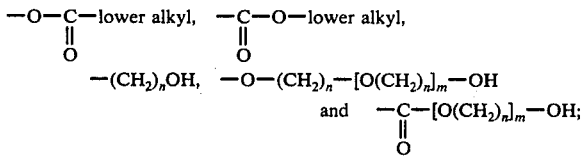

$n$ and $m$ are each an integer of 1 or more; and M is a metal; in the presence or absence of one or more other copolymerizable monomers.

3. The method for producing polyester fibers according to claim 1, wherein the starting polyester is a blend of the sulfonate group-containing polyester obtained as in claim 2 and a polyester containing at least 80% by mol of repeating units of ethylene terephthalate.

4. The method for producing polyester fibers according to claim 2, wherein the dicarboxylic acid or diol containing a metal sulfonate group is a member selected from the group consisting of sodium 3,5-di(carbomethoxy)benzenesulfonate, potassium 3,5-di(carbomethoxy)benzenesulfonate, sodium 1,8-di(carbomethoxy)naphthalene-3-sulfonate, potassium 2,5-di(carbomethoxy)-benzenesulfonate and potassium 2,5-di(hydroxyethoxy)-benzenesulfonate.

5. The method for producing polyester fibers according to claim 1, wherein the starting polyester contains the sulfonate group-containing ester unit in an amount of 1.5 to 5% by mol and has an intrinsic viscosity $[\eta]$ of 0.35 to 0.55.

6. The method for producing polyester fibers according to claim 1, wherein the melt-spinning is carried out so as to give filaments having a birefringence ($\Delta n$) of 0.020 to 0.050.

7. The method for producing polyester fibers according to claim 1, wherein the drawing of the spun filaments is carried out at a temperature of 120° C or higher and lower than the melting point of the polymer and further not higher than $4 \times (\Delta n \times 10^3) + 60°$ C.

8. The method for producing polyester fibers as recited in claim 1, in which the polyester fibers produced cause dye exhaustion in a dye bath of a basic or disperse dye at a temperature of less than 100° C. of at least 81%, said dye exhaustion being measured by colorimetry, wherein the original dye solution is prepared so that the content of the dye is 5% by weight on the basis of the weight of the fibers to be dyed, and when the remaining solution becomes completely colorless the dye exhaustion is 100%, when the color concentration of the remaining solution is half that of the original dye solution the dye exhaustion is 50%, and when the color concentration of the remaining solution is the same as that of the original dye solution the dye exhaustion is 0%.

* * * * *